July 8, 1924.
J. H. MISKIMEN
VEHICLE WHEEL RIM
Filed April 15, 1920
1,500,412
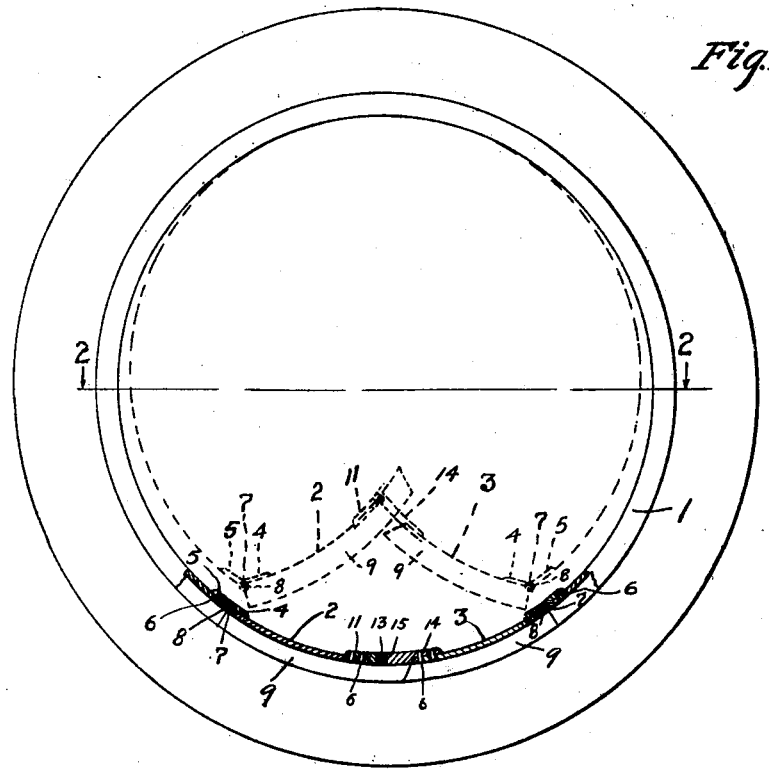
Fig.1
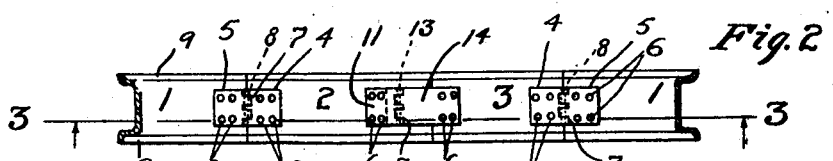
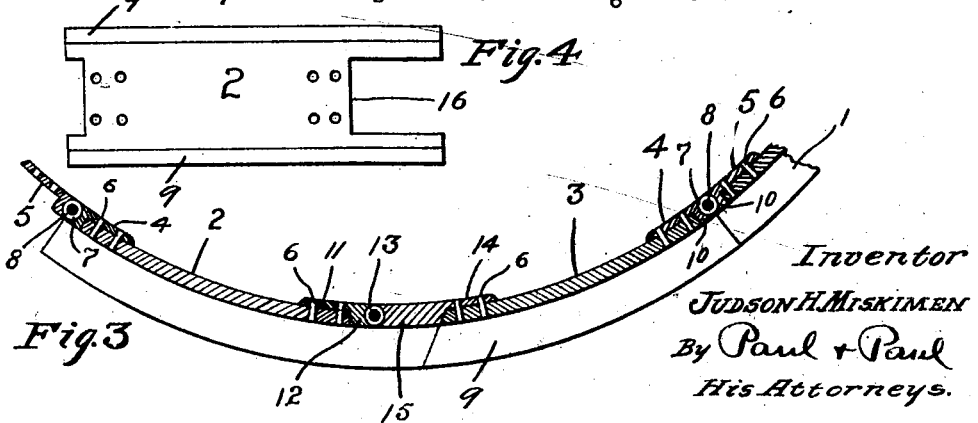
Inventor
JUDSON H. MISKIMEN
By Paul & Paul
His Attorneys.

Patented July 8, 1924.

1,500,412

UNITED STATES PATENT OFFICE.

JUDSON H. MISKIMEN, OF GLENDIVE, MONTANA.

VEHICLE WHEEL RIM.

Application filed April 15, 1920. Serial No. 374,119.

*To all whom it may concern:*

Be it known that I, JUDSON H. MISKIMEN, a citizen of the United States, and a resident of Glendive, county of Dawson, State of Montana, have invented certain new and useful Improvements in Vehicle Wheel Rims, of which the following is a specification.

This invention relates to an improvement in automobile rims of the demountable type, used in conjunction with pneumatic tires and has for its object the provision of a sectional, demountable rim having an improved means of hingedly connecting the sections together.

A more specific object is to provide an improved means hingedly to connect together the two sections which are adapted to be broken in order to facilitate the removal of a deflated pneumatic tire.

Other objects of the invention will more fully appear from the following description and the accompanying drawings, and will be pointed out in the annexed claim.

In the accompanying drawings, there has been disclosed a structure designed to carry out the objects of the invention, and it is to be understood that the invention is not confined to the exact features shown, as various changes may be made within the scope of the claim which follows.

In the drawings,

Figure 1 is a view in side elevation of the improved tire-carrying rim, with the broken position of the two operative sections shown in dotted lines, Figure 2 is a section on the line 2—2 of Figure 1, Figure 3 is a section on the line 3—3 of Figure 2, Figure 4 is a plan of one of the minor sections.

This novel demountable rim comprises a plurality of sections and is here shown as formed of three sections. The major section 1 is preferably equal to substantially four-fifths of the rim circumference, while the two minor sections, 2 and 3, are jointly equal to the remaining one-fifth of the rim circumference. The above proportions are pointed out, as they are believed to be those which are most suitable for the proper functioning of the sections.

Heretofore it has been common to hinge a plurality of rim sections together by the positioning of hinge members on the outside of the demountable rim. In such case the hinge parts are presented to the inner face of the pneumatic tire. This novel structure comprehends the placing of the three hinges here shown so that the outer face of the rim is substantially smooth and unbroken. The two hinges joining the sections 2 and 3 to the major section 1 are similar and but one need be described. Such hinge consists of leaves 4 and 5 which are adapted to be affixed to the adjacent sections. These leaves may be welded to the section in accordance with common practice, but the preferred manner is to employ rivets 6. These leaves 4 and 5 unite in a knuckle 7 carrying the pintle 8. Preferably this pintle is positioned at the juncture of the abutting ends of the adjacent sections. Each rim section at such juncture is provided with a relatively small transverse recess, such as that shown at the left in Figure 4. Such recess is formed by cutting away a small transverse portion of the base or rim surface comprehended between the two annular flanges 9. The function of these adjacent recesses is to provide a space within which may be seated the knuckle of the connecting hinge. Preferably the leaves of the hinge are provided with built-up portions or shoulders 10 adjacent the knuckle. These shoulder portions are preferably of such thickness as to provide a substantially unbroken surface for the exterior of the rim when the rim sections are in abutting position.

The hinge connecting the two minor sections 2 and 3 is preferably composed of a long leaf and a short leaf and the pintle of the hinge is so positioned that the long leaf extends across the juncture of the minor sections when in abutting position. Preferably, one of these minor sections is provided with a circumferentially extending terminal recess 16. The short leaf 11 of the hinge is secured, as, for example, by rivets 6, to the section 2 and is provided with a shoulder 12 adjacent the knuckle 13. The long leaf 14 is similarly preferably riveted to the section 3 and is provided with a shoulder 15 which is relatively long and functions to occupy the space caused by the deep recess 16 in the section 2. As shown in the drawing, these recesses do not extend completely across the rim surface or base and the flange portions 9 are not affected thereby. When the rim is in unbroken position, as shown in full lines in Figures 1, 2 and 3, a substantially unbroken outer surface is presented by this sectional rim. However, when it is desired to break the two minor sections in order to effect contraction of the rim to remove a deflated tire, the long leaf 14 will extend through the deep recess, whereby the two minor sections may be moved into the broken position shown in dotted lines in Figure 1. The dotted line position in Figure 1 shows the value of the above-mentioned proportioning of the rim sections, as the terminus of the rim section 3 can not abut against the complementary rim sections 2. Preferably, the union of the two sections 2 and 3 is inclined, the two abutting ends being complementarily beveled, as shown, to facilitate "breaking" of the hinge.

I claim as my invention:

A demountable rim formed of a plurality of sections, each section providing a base and side flanges, and hinges secured to the bases of the sections to connect the sections together, the adjacent portions of said bases having complementary terminal recesses, each hinge being provided with shoulders adjacent its knuckle, said shoulders and knuckle being adapted to be received in and to fill said complementary recesses, the outer surface of said shoulders being adapted to form a continuation of the outer surface of the rim whereby the outer surface of the bases presented to a tire are substantially unbroken and whereby one leaf of the hinge connecting two adjacent sections may extend through one of said complementary recesses when the adjacent sections are inwardly broken.

In witness whereof, I have hereunto set my hand this 10th day of April, 1920.

JUDSON H. MISKIMEN.